Patented Apr. 5, 1927.

1,623,061

UNITED STATES PATENT OFFICE.

OTIS G. MESSENGER, OF ELIZABETH, NEW JERSEY, ASSIGNOR TO STANDARD DEVELOPMENT COMPANY, A CORPORATION OF DELAWARE.

TREATING HYDROCARBONS.

No Drawing. Application filed January 6, 1921. Serial No. 435,512.

My invention relates to the treatment of hydrocarbons, and particularly low grade and refinery waste oils for making hydrocarbon derivatives.

As well known, under suitable conditions, hydrocarbon molecules are susceptible of being broken up or "cracked" into smaller molecular units. Upon this is based the commercial cracking of oils to produce light liquid distillates, gas, etc.

In accordance with the present invention, hydrocarbons are subjected to cracking conditions and suitable reactive elements or molecules are introduced at the cracking zone so that combination may be effected on the bonds as released at the points of rupture, with resultant formation of derivatives as desired.

As reactive agents, various elements or groups may be used, depending upon commercial and technical considerations and the character of products desired.

For instance, halogens may be used, bromine or chlorine especially, and depending upon the cracking conditions imposed, halogenated hydrocarbons containing one, two or more carbon atoms can be obtained.

Other radicals of the acid order may be used.

Any apparatus suitable to the conditions can be used, high pressures not being required. In fact, for the lower molecular weight derivatives—and these are in general the most valuable—high pressures must be avoided to secure the best yields. The reactive agent is in any case advisably carried by a separate conduit direct to the cracking zone of the hydrocarbon, and the feed is gauged as closely as possible in view of the particular materials used and the reaction products sought, in order to minimize waste substitutively.

Operations can be carried on in either vapor or bi-phase as desired; in general, the vapor phase producing the lighter products, while operating in bi-phase gives a more exact gradation.

While with iodine for instance, the reaction course is quite tractable, efficient means for a close control on the temperature is advisable generally, as with certain reactive agents a considerable temperature rise occurs, and a close control on temperature range, of course, is desirable as conducing to uniformity of product.

Provision may be made for taking care of acid in the off-take vapors by scrubbing in water or by passing over metal scrap or oxide. Where chlorine is used, hydrochloric acid formed is best handled in the latter manner, thereby obtaining a valuable by-product of metal chlorides.

As an example of my invention, I may mention the formation of chlor-compounds, using gas oil or a paraffin distillate as starting material. This is vaporized and is passed through a cracking tube set in a heating stack provided with by-pass flues and dampers for quick temperature control. The temperature of the vapors at the cracking zone being brought to the cracking range, in general about 700° F. and upward to 750° F. or thereabout according to the products sought, chlorine is introduced in suitable amount through a side tube direct to the cracking zone. The vapors pass off to a condenser system.

In using reduced crudes, or bottoms, a retort chamber similar to those used for oil gas may be employed, the preheated oil being simply sprayed against a heated baffle or checker-work while a stream of chlorine is directed to the same point.

The temperatures employed will of course in every case depend upon the size of the predominant hydrocarbon molecules desired, as is well known in oil and gas practice.

The chlor-hydrocarbons can be used as such for solvents, etc., or where desired they may be used to react upon suitable salts or compounds to produce other compounds, for instance by reacting upon sodium acetate, methyl, ethyl, etc., acetates may be obtained, or, by treating with alkalis or hydrides, alcohols, glycols or hydrocarbons may be obtained.

My invention in its broader aspects is not to be confused with the proposals heretofore made to crack oils in a retort atmosphere of natural gas, carbon dioxide, etc., or with hydrogen or oxygen. With the former, the gas is inert and is used merely for building up a high pressure on the oil; in the case of the hydrogen, even if any combination does occur, the products are still hydrocarbons. In the case of oxygen the action is a combustion of portions of hydrocarbon to supply cracking temperature for the rest, and the products are water and carbon dioxid and cracked hydrocarbons. My invention, on the other hand, makes derivatives of hydrocarbons and in essence comprises cracking hydrocarbons and at the same time introducing a reactive element or group (designated by the term "reactive radical" in the claims hereinafter) or on the nascent bonds at the point of rupture as the chain cracks into smaller units. While the invention has been described with particularity by specific examples, changes and modifications may be made without departing from the scope of the claims hereto appended, in which I desire to claim all inherent novelty.

What I claim is—

1. A process of making low boiling chlorhydrocarbons, which comprises vaporizing a gas oil, passing the vapors at low pressure through a cracking zone maintained at approximately 750° F., and introducing chlorine into the oil vapors in said cracking zone, the chlorine feed being gauged in view of the products sought.

2. A process of making low boiling chlorhydrocarbons, which comprises passing hydrocarbon vapors at low pressure through a cracking zone maintained at approximately 750° F., and introducing chlorine into the products so obtained to react with said products at the moment of their formation.

3. A process of making low boiling chlorhydrocarbons, which comprises passing hydrocarbon vapors through a cracking zone maintained at approximately 750° F. to which chlorine is conducted whereby reaction takes place at the moment of cracking.

4. A process of making halogenated hydrocarbons, which comprises subjecting hydrocarbons to a temperature of approximately 750° F., while conducting a halogen to the cracking zone to additively combine with the nascent hydrocarbon molecules at the moment of their formation.

OTIS G. MESSENGER.